(12) United States Patent
Haemel et al.

(10) Patent No.: US 7,945,416 B2
(45) Date of Patent: May 17, 2011

(54) SOFTWARE OR HARDWARE TEST APPARATUS AND METHOD

(75) Inventors: Nicholas A. Haemel, Providence, RI (US); Zack S. Waters, Merrimack, NH (US)

(73) Assignee: ATI Technologies, ULC, Ontario (CA)

( * ) Notice: Subject to any disclaimer, the term of this patent is extended or adjusted under 35 U.S.C. 154(b) by 358 days.

(21) Appl. No.: 11/279,464

(22) Filed: Apr. 12, 2006

(65) Prior Publication Data

US 2007/0244663 A1 Oct. 18, 2007

(51) Int. Cl.
*G06F 19/00* (2006.01)
(52) U.S. Cl. .................................................. 702/117
(58) Field of Classification Search .............. 702/57–58, 702/79, 108, 117–120, 123, 176–178, 182–185, 702/186; 714/25–26, 48, 55, 57
See application file for complete search history.

(56) References Cited

U.S. PATENT DOCUMENTS

| | | | |
|---|---|---|---|
| 4,393,446 A * | 7/1983 | Gurr et al. ...................... 713/502 |
| 5,197,127 A * | 3/1993 | Waclawsky et al. .......... 709/224 |
| 5,371,883 A | 12/1994 | Gross et al. ...................... 714/38 |
| 5,671,351 A * | 9/1997 | Wild et al. ...................... 714/38 |
| 5,742,754 A | 4/1998 | Tse ................................. 714/38 |
| 6,014,760 A | 1/2000 | Silva et al. ...................... 714/46 |
| 6,061,732 A * | 5/2000 | Korst et al. .................... 709/231 |
| 6,167,537 A | 12/2000 | Silva et al. ...................... 714/46 |
| 6,360,268 B1 | 3/2002 | Silva et al. .................... 709/227 |
| 6,467,054 B1 * | 10/2002 | Lenny ............................. 714/42 |
| 6,507,794 B1 * | 1/2003 | Hubbard et al. ................ 702/60 |
| 6,543,047 B1 | 4/2003 | Vrhel, Jr. et al. ............. 717/121 |
| 6,711,134 B1 * | 3/2004 | Wichelman et al. .......... 370/241 |
| 6,779,134 B1 | 8/2004 | Laviolette et al. .............. 714/38 |
| 7,003,414 B1 * | 2/2006 | Wichelman et al. ............. 702/76 |
| 7,050,401 B1 * | 5/2006 | Wichelman et al. .......... 370/252 |
| 2005/0283553 A1 * | 12/2005 | Droba ........................... 710/200 |
| 2006/0284632 A1 * | 12/2006 | Braverman et al. ........... 324/765 |

* cited by examiner

*Primary Examiner* — Bryan Bui
(74) *Attorney, Agent, or Firm* — Vedder Price, P.C.

(57) ABSTRACT

A software or hardware test system and method repeatedly obtains testing status of a plurality of test units in a group while the test units are testing hardware or software being executed on the test units. The system and method provides for display of the current testing status of the plurality of units of the group while the plurality of test units is performing software testing. In another embodiment, a test system and method compiles heuristic data for a plurality of test units that are assigned to one or more groups of test units. The heuristic data may include, for example, data representing a frequency of use on a per-test unit basis over a period of time, and other heuristic data. The test system and method evaluates job queue sizes on a per-group basis to determine whether there are under-utilized test units in the group and determines on a per-group of test unit basis whether a first group allows for dynamic reassignment of a test unit in the group based on at least the compiled heuristic data. If the unit is allowed to be dynamically reassigned, the test system and method reassigns the test unit whose heuristic data meets a specific set of criteria.

26 Claims, 11 Drawing Sheets

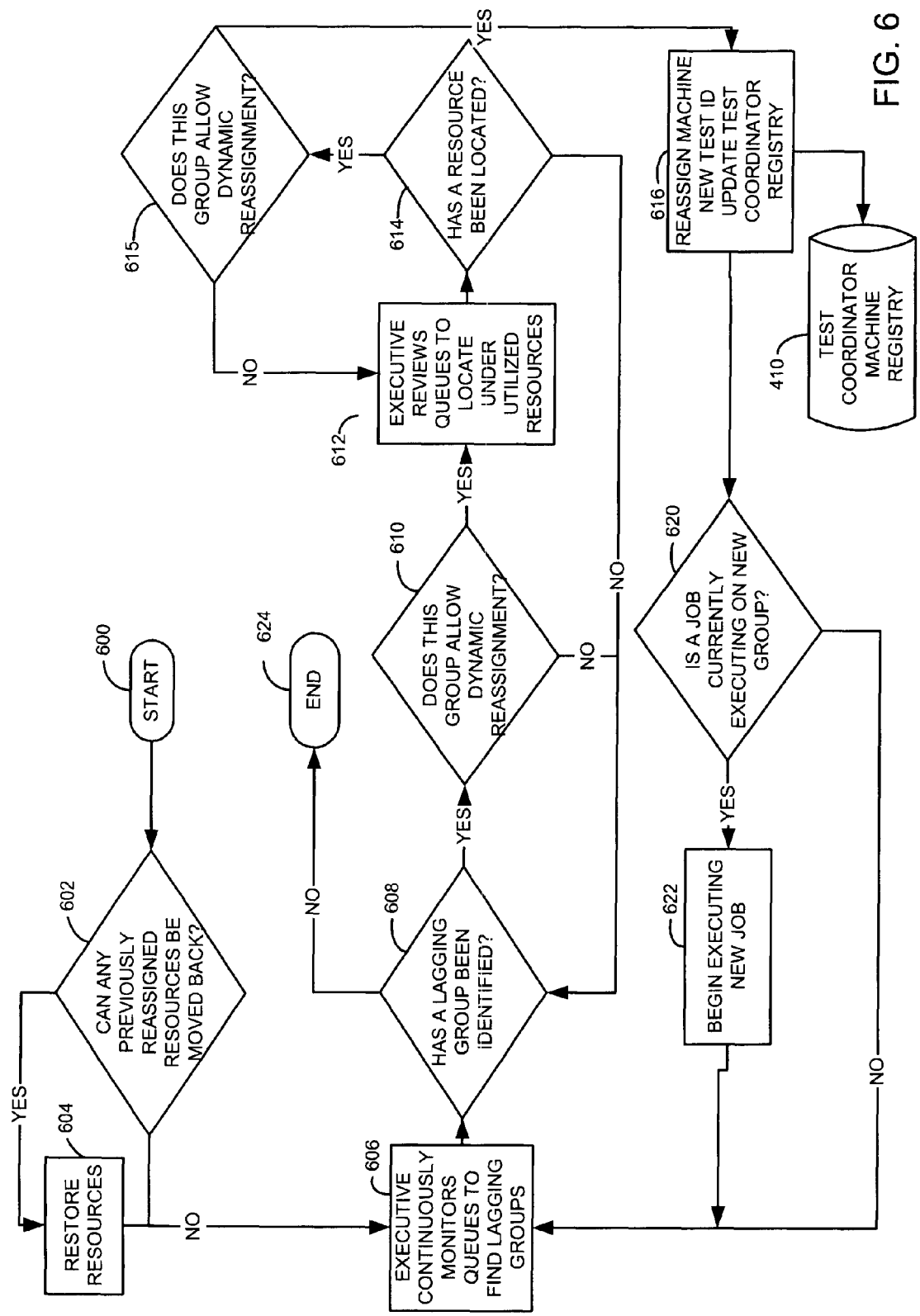

SOFTWARE OR HARDWARE TEST APPARATUS AND METHOD

BACKGROUND OF THE INVENTION

The invention relates generally to software test systems and methods and more particularly to software test systems and methods for testing software or hardware, such as drivers, in a plurality of different test stations having the same or different software and hardware configurations.

Product testing has become an integral part of the success of products. Certain products require both the testing of hardware and associated software. For example, graphics processors have associated software drivers to suitably control operation of the graphics processor (e.g., graphics/video processors). Graphics processors are typically one of many components in a computer system, handheld device or other suitable device that may include a processor, system memory, an operating system and other software applications. With the rapid changes in hardware configurations by different manufacturers for varying devices and other data processing devices, and with the rapid development of differing software drivers for various hardware components, there is a need to test software on devices having the same or differing hardware platforms and/or differing operating systems with different processor speeds, different software configurations, and different applications to ensure that the software and hardware under test operates correctly in the proper environment.

Automated test systems are known. Automated testing systems may be distributed such that testing of hardware and software may be accommodated through a network such as the Internet or Intranet which may allow a user to control units under test via a web based control interface. In one example, a dispatcher machine may, among other things, receive data packets from test machines indicating that the test machines are available to perform tests. Upon receiving an availability data packet, the dispatcher machine determines whether one or more of the tests on a list of tests maintained by the dispatcher machine is capable of being performed by the test machine which generated the availability data packet. Hence, one dispatcher which may be hardwired to a group of test machines utilizes one test queue of incoming jobs per dispatcher. Such systems do not appear to allow the selection of a particular dispatcher or a selection of a particular machine to be used nor do they appear to support subdivisions of test machines to a given task. In addition, systems typically do not provide an indication of the current testing status of the test units that are performing testing in real time but instead provide a result of tests once the tests are complete. In addition, systems do not typically allow reassignment among groups of test units in a suitable fashion.

Accordingly, a need exists for an improved software test system and method that at least addresses one or more of the above issues.

BRIEF DESCRIPTION OF THE DRAWINGS

The invention will be more readily understood in view of the following description when accompanied by the below figures and wherein like reference numerals represent like elements:

FIG. 6 is a flowchart illustrating one example of a method for testing software in accordance with one embodiment of the invention;

DETAILED DESCRIPTION OF A PREFERRED EMBODIMENT OF THE INVENTION

Briefly, a software or hardware test system and method repeatedly obtains testing status of a plurality of test units in a group while the test units are testing hardware on the test units or software being executed on the test units. The system and method provides for display, the current testing status of the plurality of units of the group while the plurality of test units are performing software or hardware testing. In another embodiment, a test system and method compiles heuristic data for a plurality of test units that are assigned to one or more groups of test units. The heuristic data may include, for example, data representing a frequency of use on a per-test unit basis over a period of time, and other heuristic data. The test system and method evaluates job queue sizes on a per-group basis to determine whether there are under-utilized test units in the group and determines on a per-group of test unit basis whether a first group allows for dynamic reassignment of a test unit in the group based on at least the compiled heuristic data. If the unit is allowed to be dynamically reassigned, the test system and method reassigns the test unit whose heuristic data meets a specific set of criteria. The test system and method may also determine if the test unit has undergone a software or hardware malfunction and in response, remotely cycles power on a test unit using a remotely controllable power supply, such as a network addressable power supply. In another example, the test system and method provides selectable test control data, for example, through a graphic user interface, which in response to user input selects test replication control data that replicates a test job across a plurality of test units in a group. The selectable test control data may also control distribution of tests within a test job to different test units in a group.

Accordingly, among other advantages, the system and method provides for the selection of groups of machines and can provide dynamic load balancing either by distributing the same tests across multiple groups or portions of tests within a group or across multiple test units. Other advantages will be recognized by those of ordinary skill in the art. For example, providing real time current testing status for a user can allow the user to make decisions as to whether additional test jobs should be allocated to particular test units or groups of test units.

Figure 1:
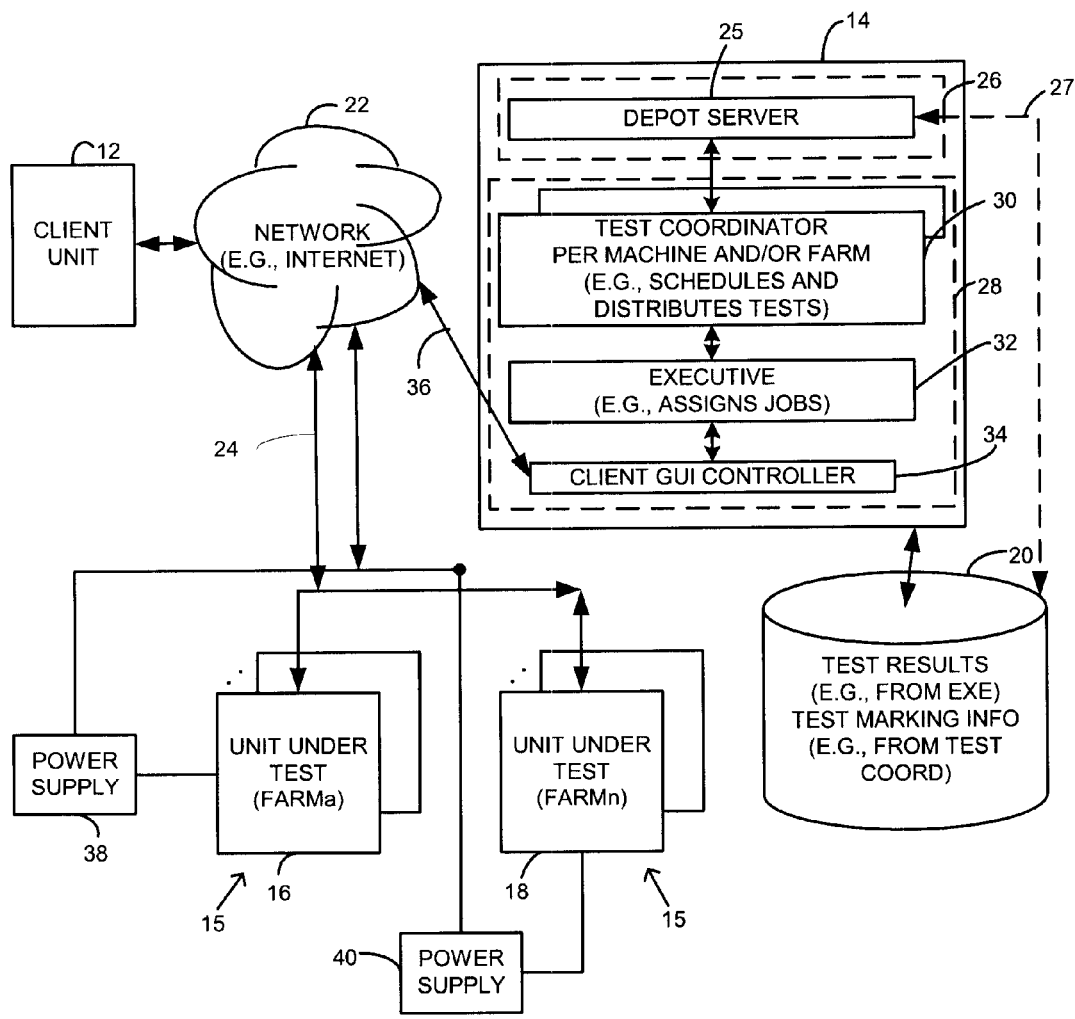
FIG. 1 is a block diagram illustrating one example of a software test system in accordance with one embodiment of the invention.

FIG. 1 illustrates one example of a software or hardware test system 10 that includes a plurality of client units 12, a test controller 14, a plurality of groups 15 of units under test (test units) 16 and 18, and memory 20, such as a database, that stores test results and other information as provided by the test controller 14. The client unit 12 is in operative communication with the test controller 14 through a suitable network 22 and in this example, is coupled through an Ethernet connection. The client unit 12 may be any suitable device including, but not limited to, a desktop computer, handheld device, or any other suitable device with network, local or Internet access and a suitable graphic user interface presenter such as a web browser or other user interface. The test controller 14 may also be any suitable computing apparatus such as one or more work stations, servers, desktop computers, laptop computers or any other suitable device. The test controller 14 is operatively coupled to the groups of units under test 16 and 18 through one or more suitable communication link generally shown as 24.

The test controller 14 in this example, may be implemented as a plurality of computers such as hardware server computers wherein each server includes one or more digital processors that have access to associated memory that contains executable instructions that when executed, cause the one or more processors of the one or more computers to carry out the operations described herein. In this example, the test controller 14 includes a server device 26 that includes a depot server 25 such as a software server module executing by one or more processors, and another server 28 that also executes a plurality of software modules stored in memory. Each of the servers 26 and 28 may share or utilize the same microprocessor or employ parallel processing or distributed processing and may also include associated memory that contains executable instructions that, when executed, cause the one or more processors of the servers 26 and 28 to operate as described herein. The memory may be for example, but is not limited to, RAM, ROM, distributed memory such as that distributed via different websites or distributed on differing devices. Any other suitable configuration may also be used. The software modules include a test coordinator 30 per machine and/or group of machines. Hence, multiple test coordinators 30 may be employed. In addition, an executive module 32 is also included in the server 28 and suitably communicates with a client graphic user interface controller module 34 to provide graphic user interface control information 36 that is used to present graphic user interface information to the client unit 12, such as web pages or any other suitable pages. The test controller 14 may be a web server based system accessible via the Internet via the client unit 12 and the units under test 16 and 18 may also be coupled via a local area network via a suitable bus 24 to the test controller 14 or may be remotely accessible through any suitable link as desired. In addition, the system 10 includes remotely addressable power supplies 38 and 40 on a per-test unit basis to facilitate remote power cycling by a user or test controller to hard reboot units under test in response to a detected malfunction.

The depot server 25 stores and retrieves test results from memory 20 as shown by dashed line 27 and also stores the tests to be run on the test units. The test units 16 and 18 utilize a test unit module to access the depot server 25 to obtain the requisite tests assigned to that unit under test and to store the test results and status information as described below. The test coordinator 30 schedules and distributes tests to one or more test units in the various groups of units under test 16 and 18, and the executive 32 generally assigns jobs to the various groups of units under test and/or separate units.

The executive 32 is responsible for scheduling the tests for each group of test units and is responsible for the reallocation of test machines using the test coordinator 30. The executive 32 may be thought of, from a functional perspective, as a layer on top of the test coordinator 30. The executive 32 identifies new items which need to be tested such as software driver components, creates jobs and schedules jobs to multiple units under test. The new items may be obtained from various remote servers such as those that provide newly created drivers and creates new sets of jobs for each driver. A new job can be run in any single group or multiple groups. A job typically consists of the driver to be tested, information describing how and where to test a driver and any additional information as necessary. The executive 32 starts a job by passing the job to the test coordinator 30. In this example, there are two types of test configuration modes. A "distributed" mode which allows each test listed in a job configuration to be run on any singular available resource in a given group and a "replicated" mode which requires that every test in a job be run on every test resource in a group. When the mode for a job is "replicate", every resource in a group runs every task in the task list. If the mode is "distribute", each task is started on a particular resource (i.e., test unit) for a group when the first unit under test becomes available. As used herein, the testing of a software driver for a given processor or application specific integrated circuit (ASIC), for example, also includes the testing of the ASIC since defective ASICs can also be potentially detected. However, the discussion herein will focus on the testing of software for illustrative purposes only. It will be recognized that the operations described herein may be carried out by any suitable functional block and in any suitable order. For example, the operations carried out by a test coordinator may also be carried out by an executive and so on.

Figure 2:
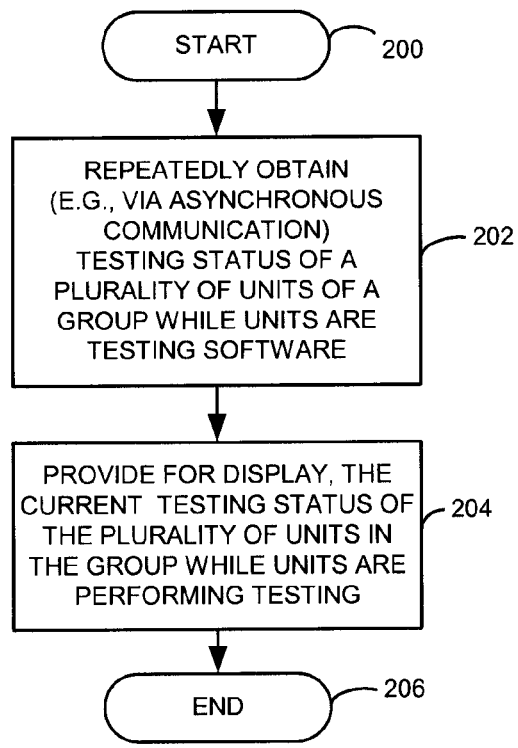
FIG. 2 is a flowchart illustrating one example of a method for testing software in accordance with one embodiment of the invention.

FIG. 2 illustrates one example of a flowchart illustrating a method for testing software which includes, as shown in block 200, running tests on a unit under test. As shown in block 202, the method includes repeatedly obtaining testing status of a plurality of units of a group while the test units are testing software. For example, when a test machine 16 is selected to test, a test machine module is loaded on the unit under test 16 by the test coordinator 30 prior to or as part of a job. As such, a test machine module executes on each unit under test 16 and can be set up so that the test machine module is set up on each operating system so that it loads when the operating system loads. The test machine module creates a profile for the test machine that it is running on and provides the profile for the respective test coordinator 30. This includes information such as the operating system, the operating system version, the type of CPU on the unit under test, the speed of the CPU, the graphics hardware, network hardware, driver versions for all drivers and any other suitable information. The test machine module is also the component that receives the specific tests/actions to be executed from the respective test coordinator 30 and also receives the memory location to which it must send results for storage in the memory 20. As each unit under test becomes available, the test machine module communicates with the test coordinator 30 to make the test coordinator 30 aware of the presence of the unit. Based on the profile, the test controller 14 assigns the machine to a group of units and information on each test machine or unit under test and its testing efficiency is maintained as described below. The test machine module causes each unit to send a message periodically to the test coordinator 30 indicating the test machine status while it is testing software. This may be sent asynchronously during testing by each unit under test and the test coordinator 30 obtains the testing status either by receiving messages from the unit under test or querying a database entry or entries populated by the test units as desired.

As shown in block 204, the method includes providing for display, for example, through a GUI on the client unit 12, of the current testing status of the plurality of units in a group while the units are performing testing. The current testing status for each particular test unit under test may be stored in a machine status registry in memory 20. The test coordinator 30 compiles the information and provides the information to the executive 32 for communication to the client unit 12 via the client GUI controller 34. The operator of the client unit 12 may then suitably evaluate in real time the testing status of each of the units under test via the graphic user interface presented on the client unit 12. As noted, the client GUI controller 34 may provide suitable web page information so that the client unit 12 may suitably present a web based GUI output for a user. The method may then continuously repeat as desired as indicated by block 206.

Figure 3:
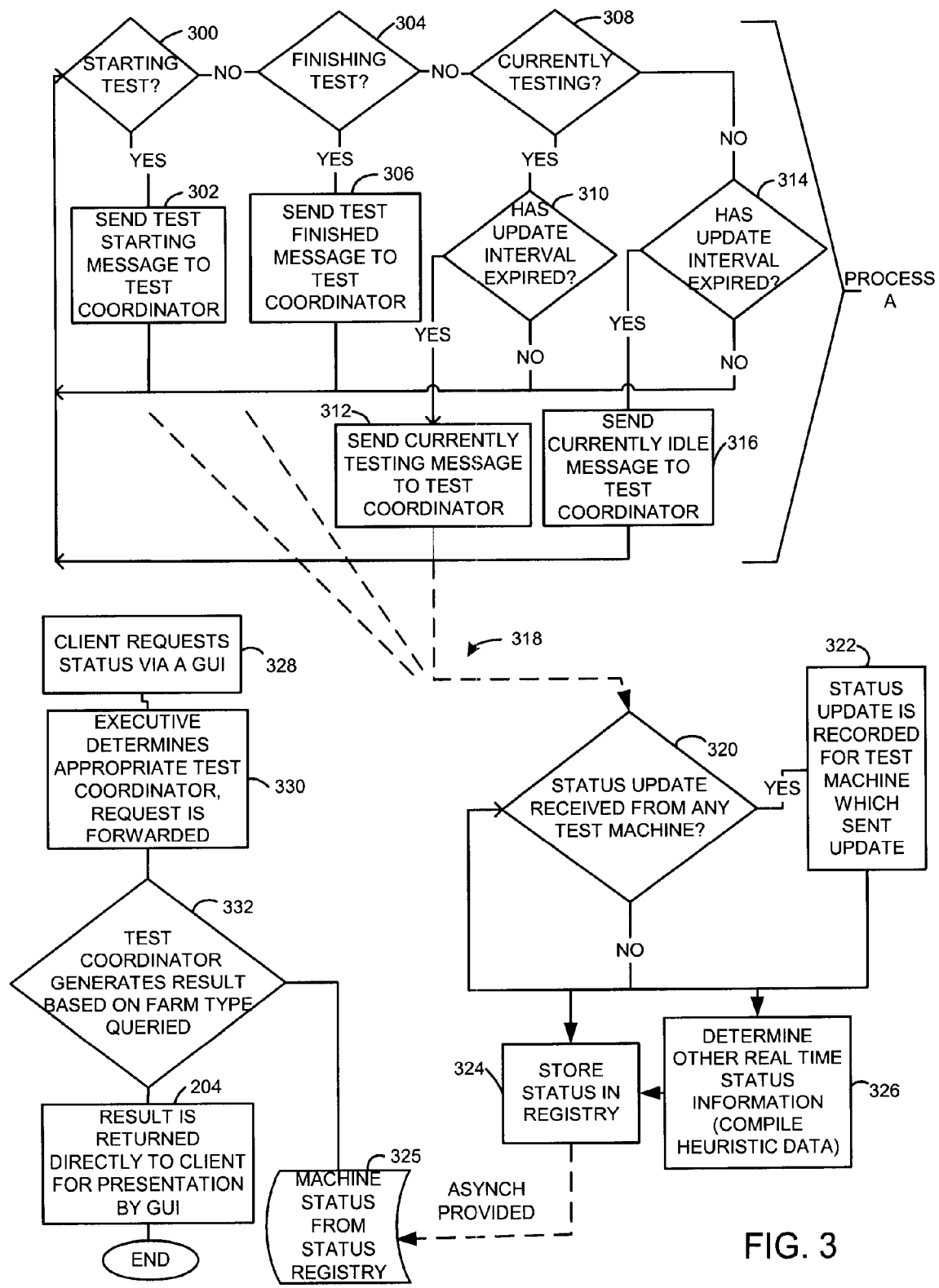
FIG. 3 is a flowchart illustrating one example of a method for testing software in accordance with one embodiment of the invention.

Referring to FIG. 3, the testing status that is obtained may be, for example, status as to whether a test unit is "idle". In addition, the test controller 14 also determines, on a per-test unit basis, an amount of time remaining for a particular software test to complete, and may provide the testing status and data representing the amount of time remaining for the particular software test to complete for display on a suitable display screen on the client unit 12 or other display. The process indicated as process A may be carried out, for example, on a test machine executing the test machine module. As such, the process A provides the test coordinator 30 status update information on the unit under test, also referred to as the testing status information 36. As shown in block 300, if testing has started, the method includes sending, such as by the unit under test, a test starting message to the test coordinator 30 as shown in block 302. If however testing has not started, the test machine module and hence the test machine, determines if it has just finished with a test as shown in block 304. If so, the test unit sends a test finished message to the test coordinator 30 as shown in block 306. However, if an executing test is not finished, the test machine determines if it is currently running a test as shown in block 308, and if so, determines if a test update interval has expired as shown in block 310. If not, the process and monitoring continues. However, if the update interval period has expired, such as a time out occurring, the method includes sending a "currently testing" message to the test coordinator as shown in block 312.

As shown in block 314, if it is determined that the testing has stopped, the test unit determines if the status update interval has expired. If not, the process continues. However, if the status update interval has expired, the method includes, as shown in block 316, sending a currently "idle" message to the test coordinator 30.

As shown by dashed lines 318, the testing status information 36 is sent via a message to the test coordinator 30. The test coordinator 30 may then determine if a status update has been received from any test machine as shown in block 320. If so, as shown in block 322, the method includes storing the testing status information 36 for a particular test machine which sent the testing status. This information is stored in a status registry as shown in block 324. Other real time status information may also be obtained from the test unit as shown in block 326. For example, the test units themselves or test coordinator (or other suitable component) may determine on a per-group or per-system basis, the elapsed time of a given test, an indication of a test name being run on a given test unit or a group of units and the test suite from which the test came. Any other suitable real time status information may also be provided by the unit under test. The test status information 318 is asynchronously provided by each of the units under test. Accordingly, it is also asynchronously stored. As shown in block 328, when a client unit 12 makes a status request via a graphic user interface input, the request is communicated to the client GUI controller 34 and to the executive 32. As shown in block 330, the executive determines the appropriate test coordinator 30 for which the request pertains and forwards the request to the appropriate test coordinator. As noted above, a test coordinator 30 may be provided on a per-machine and/or per-group basis. As shown in block 332, the test coordinator 30 generates the status information for display based on the group type that has been queried. The method includes communicating the test results to the client unit 12 for presentation by the graphic user interface as shown in block 204. As such, the test coordinator 30 generates a real time status registry 325 that contains asynchronously received status data from, for example, all test units in a group and the real time status registry 325 is updated continuously during testing. The status registry 325 may be stored in the memory 20, or any other suitable location.

The test coordinator 30 may also store in the memory 20 a test coordinator machine registry which stores the machine profile provided by each unit under test. This information may be stored in a test coordinator machine registry 410 (see FIG. 4) when a new machine is booted up and connects to the respective test coordinator.

The method may also include determining whether a test unit that is assigned to a first group of test units is available for reassignment to another group of test units. If the test unit is available for reassignment, the method includes updating a test coordinator machine registry with an identifier associated with the other group for the test unit. The method then includes causing the first unit to perform tests as a test unit of the second group. In this manner, test units may be reassigned to different groups as required. This may be done by the test coordinator or other suitable component.

Figure 4:
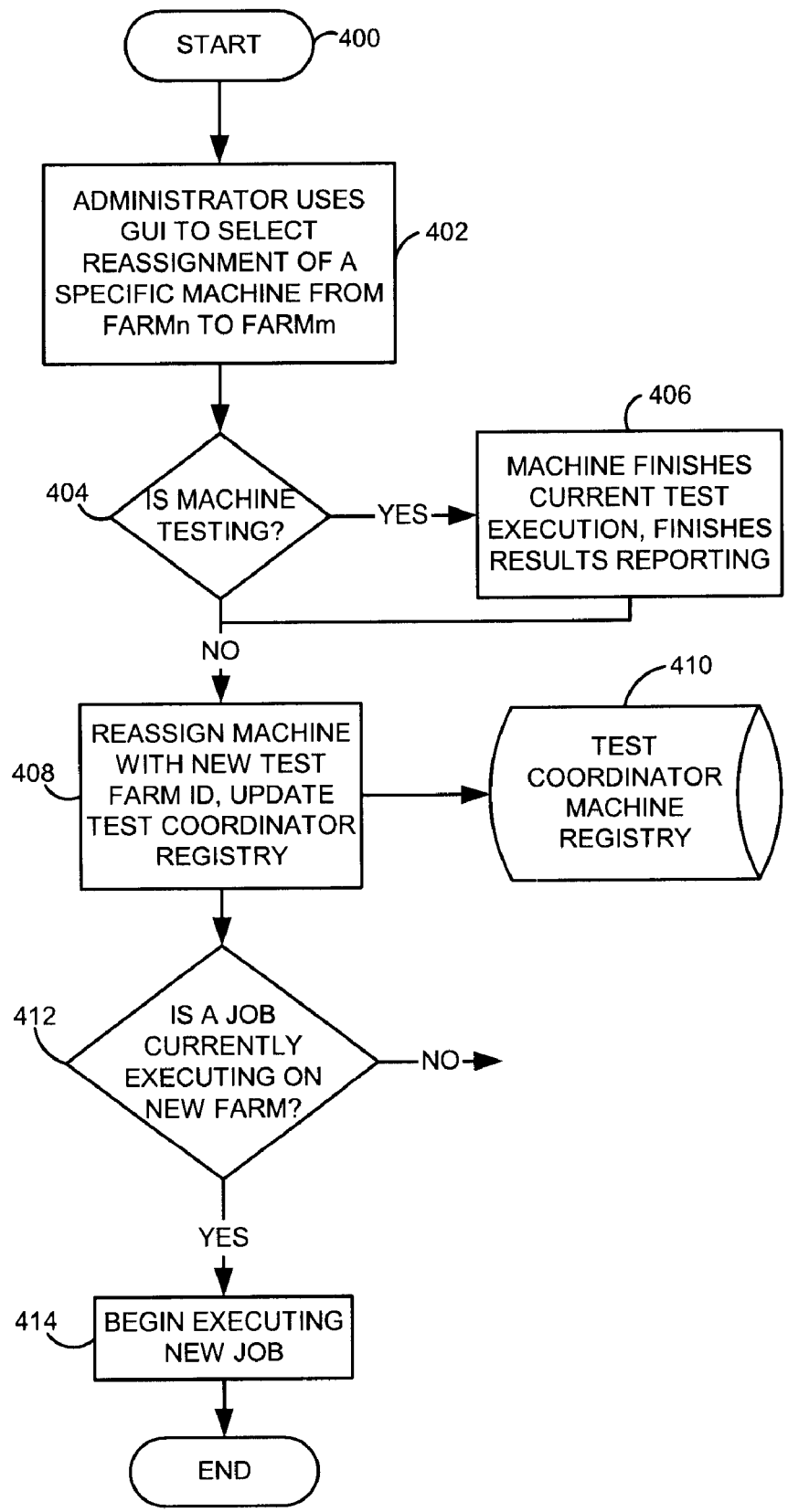
FIG. 4 is a flowchart illustrating one example of a method for testing software in accordance with one embodiment of the invention.

For example, FIG. 4 illustrates one example of a flowchart illustrating a method for software testing that includes, as shown in block 402, the executive 32 providing a graphic user interface via the client GUI controller 34 to the client unit 12 to allow an operator or administrator to select reassignment of a specific test machine from one group to another group. As shown in block 402, the selected information from the GUI is sent to the client GUI controller 34 and to the test coordinator 30. As shown in block 404, the method includes determining if the designated machine is testing. If so, the machine finishes the current test execution and finishes the test results reporting as shown in block 406. The method includes, as shown in block 408, reassigning the specified machine with a newest group ID and updating the test coordinator registry 410. As shown in block 412, if a job is currently executing on the new group, the method includes, as shown in block 414, executing the new job. If no job is executing, the farm waits for another job. If a job was already executing on the new farm, the new machine will begin testing along with the new farm. The method may then continue as needed.

Figure 5:
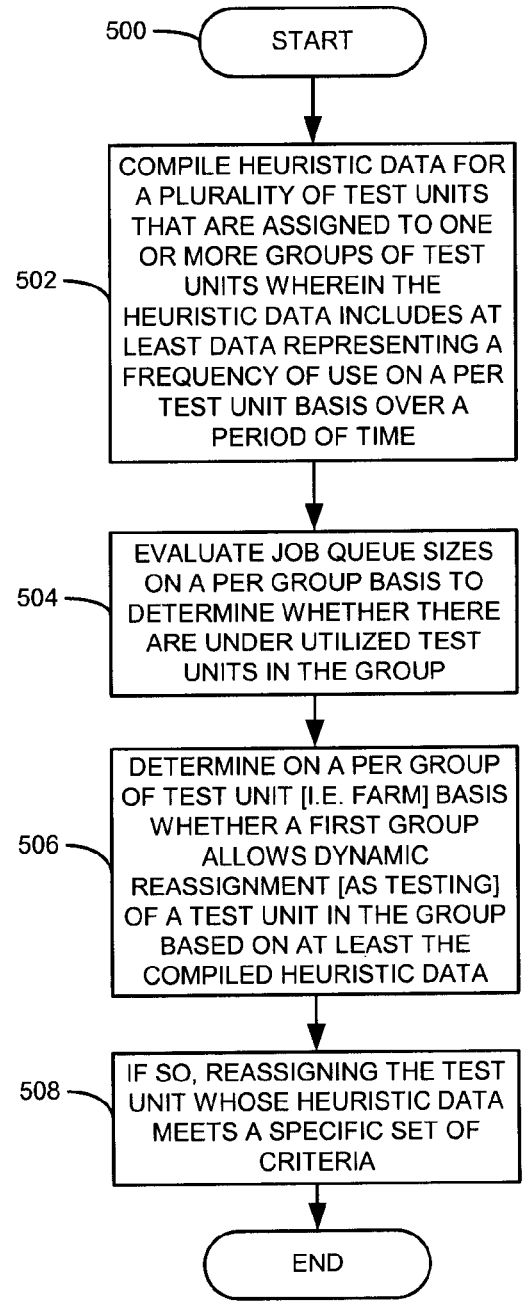
FIG. 5 is a flowchart illustrating one example of a method for testing software in accordance with one embodiment of the invention.

Reassignment may also be done by executive automatically based on compiled heuristic data. FIG. 5 illustrates one example of a method for testing software in accordance with one embodiment of the invention. As shown in block 500, the method may begin, for example, by identifying the one or more groups of test units for which the system wants to compile heuristic data. For example, only groups that primarily test jobs that are load balanced may be used to compile heuristic data, although any suitable group of test units may be used. As shown in block 502, the method includes compiling heuristic data for a plurality of test units that are assigned to one or more groups of test units. The heuristic data includes at least data representing a frequency of use on a per-test unit basis over a period of time. For example, the executive 32 may provide a suitable interface such as a graphic user interface that is presented to a user via the client unit 12 to allow the ability to remotely control which resources are available for the system to use and what components are allowed testing access. The executive, in this example, stores heuristic data and collects some of it, such as how long a test job took for any given queue, an average queue length, the number of jobs run or submitted per hour. The test coordinator also collects some info, passing it on to executive such as how long a particular test took to run on a per test set basis, an average test runtime, a longest or shortest test runtime or any other suitable data. The executive 32 compiles the heuristic data such as real time status information (see for example, FIG. 3, block 326).

As shown in block 504, executive 32 may also evaluate job queue sizes on a per-group basis to determine whether there are under-utilized test units in the group. For example, if the job queue size is large for a given group and small for others, there is an indication that there are under-utilized test units in the group with the lower job queue size. The job queue size information may be suitably stored in memory and provided by executive since executive manages queuing of jobs and job assignments. As shown in block 506, the method includes determining, on a per-group of test unit basis, whether a first group of test units allows dynamic reassignment of a test unit in the group based on configuration information stored for test units. The farm has a status indication indicating that it is ok for machines to be reassigned in the group. As shown in block 508, if the group of test units allows dynamic reassignment of a test unit in the group, the method includes reassigning the test unit whose heuristic data meets a specific set of criteria. The specific set of criteria may be suitably stored in memory 20 and may be, for example, data representing machine usage, for instance if a machine in one group has a utilization of 10% and another group has a utilization of 98%, the first machine is moved out of its old group and into the new over-utilized group. Other criteria as mentioned herein or any other suitable criteria may also be used. The method may also include determining on a per-group of test unit basis whether a first group of test units is compatible for dynamic reassignment based on whether a test unit in the group has hardware and an operating system configuration sufficient for a job of interest. The test coordinator 30 may also reassign the test unit whose heuristic data meets a specific set of criteria to a different group of test units by updating the test coordinator registry 410 with a new group identifier for the test unit to be reassigned.

FIG. 6 illustrates a flowchart of an example of a method for testing software by dynamically reassigning a unit under test based on configuration information, compiled heuristic data and job queue sizes for a given farm. For example, the executive 32 may dynamically reassign jobs to different groups of test units or different test units within a group based on configuration information such as whether a test unit in a group also has hardware and an operating system compatible for a job of interest as well as heuristic data such as data representing a frequency of use of a test unit over time indicating, for example, whether a particular test unit has been used often so that past history of machine use in a particular group is utilized. In addition, the job queue size for a given group of test units may also be used. If a queue is overloaded (100+ jobs) and another queue for a different farm is empty, the system considers reassigning some of the resources from the queue with no jobs to the one with over 100. The method can improve load balancing of jobs across groups of test units. As shown in block 600, the method begins and as shown in block 602, the method includes determining if any previously reassigned test units can be moved back to their original group. If any machines are recorded as having been reassigned, they are checked to see if the queues they have been reassigned to are empty. If so they can be assigned back. If so, as shown in block 604, the method includes restoring the test units to their previous groups. The executive is responsible for making the decision, while the test coordinator registers the change. As shown in block 606, the method includes continuously monitoring job queues to identify lagging groups of test units which is an indication of unused resources. This may be done, for example, by the executive 32 by comparing job queue lengths across groups.

As shown in block 608, if a lagging group has not been identified, the method continues to block 624. However, if a lagging group of test units have been identified, the method includes, as shown in block 610, determining if the group allows dynamic reassignment. This selection may be indicated through any suitable data field associated with a particular group profile and may be set, for example, by an operator through a user interface via the client unit 12. Accordingly, an administrator may indicate which groups of test units are candidates for dynamic reassignment. If the group does not allow dynamic reassignment, the method continues to block 606 where the queues are monitored. However, as shown in block 612, if the group is allowed for dynamic reassignment, the method includes reviewing job queues for each group to locate under-utilized resources. As shown in block 614, if an under-utilized resource has been located, the method, as shown in block 615, includes determining whether the under-utilized resource allows dynamic reassignment. If the identified group does not allow dynamic reassignment, the method proceeds back to block 612 where executive continues to look for a different under utilized resource. If the group does allow dynamic reassignment, the executive in this example, reassigns the test unit from the under-utilized group by assigning a new test group identifier to the test machine and updates the test coordinator registry 410 as shown in block 616. As shown in block 620, the method includes determining if a test job is currently executing on the new group of test units. If a job is not currently executing on the new group that includes the reassigned test unit, the method proceeds to block 606. However, if a job is currently executing on the group, the method includes executing a new job as shown in block 622. The newly reassigned machine will start testing the job that is already running on the new over-utilized farm.

Referring back to block 614, to determine if the group allows dynamic reassignment, the method may include evaluating test unit configuration information to determine whether a test unit within the group or entire group of test units are compatible in terms of operating system and hardware necessary for a given test. The method also may include evaluating the heuristic data compiled for a given test unit to determine whether the compiled heuristic data meets a set of criteria, such as whether the heuristic data is above or below a set threshold. An example of a useful heuristic would be past usage of under-utilized resources, average running time for jobs, etc. As such, the method includes reassigning a test unit whose heuristic data meets a specific set of criteria so that the test unit is reassigned to a different group of test units. This is performed in one example by updating the test coordinator registry 410 with a new group identifier for the test unit to be reassigned.

Figure 7:
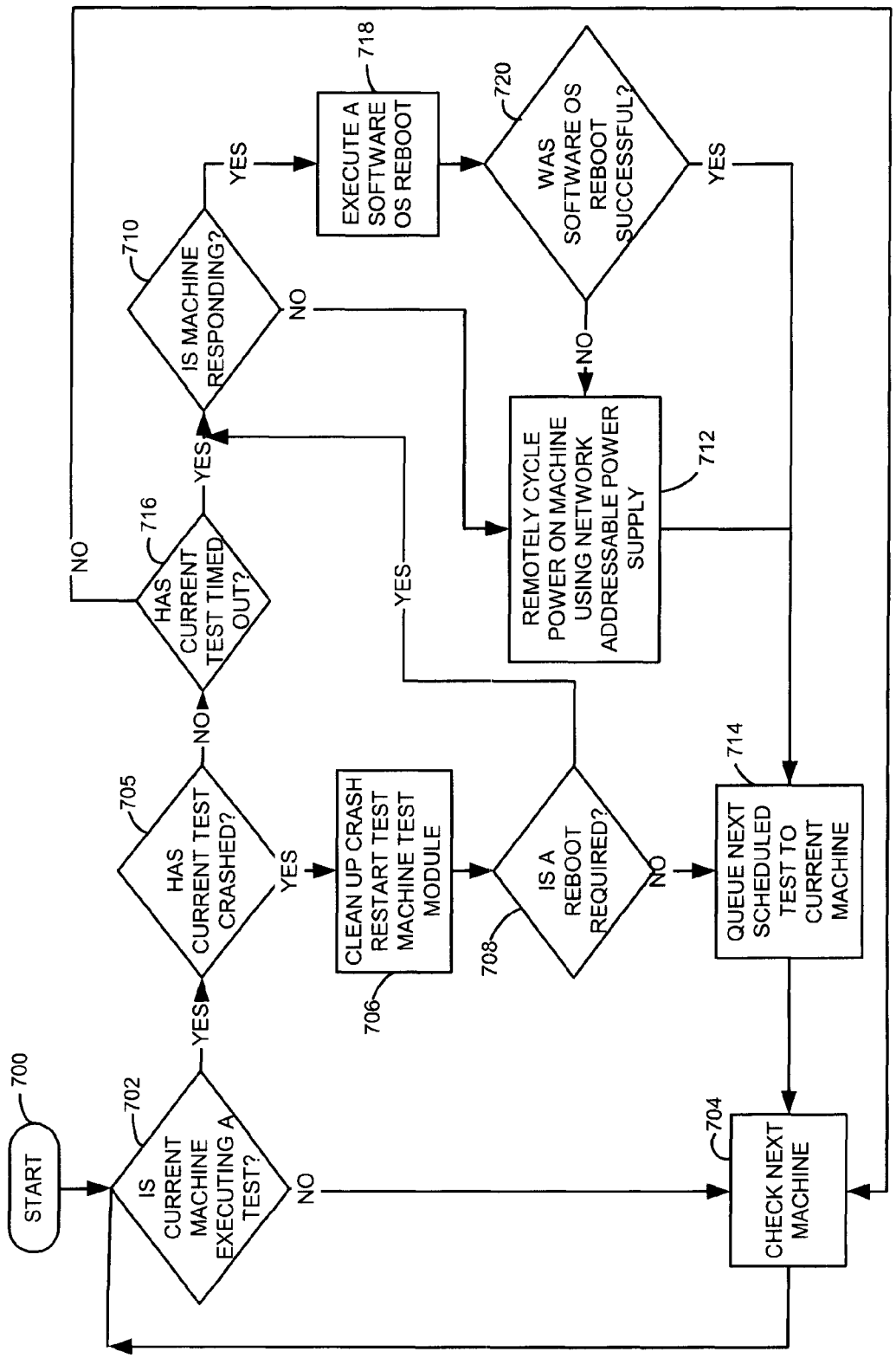
FIG. 7 is a flowchart illustrating one example of a method for testing software in accordance with one embodiment of the invention.

FIG. 7 illustrates a method for testing software that illustrates one example of a method for test unit recovery after a fault has been detected. The process shown in FIG. 7 may be carried out, for example, by the test coordinator 30 or any other suitable component. As shown in block 700, the method begins and as shown in block 702, the method includes determining whether a current machine being evaluated is executing a test based on testing status information provided by the test unit. If not, then as shown in block 704, the method includes checking the next test machine and continuing to block 702. However, if a current test machine is executing a test, the method includes determining whether the current test has crashed as shown in block 705. This may be done by inspecting the results of the running test, such as the process exit status. If the test has crashed, the method includes, as shown in block 706, recording any resident error state and resetting the test module on the test machine through a soft restart mechanism as known in the art. As shown in block 708, the method includes determining whether a hard reboot of the test machine is required. If resetting the test module on the test machine was not successful (i.e. it is no longer responding) then a hard reboot is required. If so, the method includes confirming this by determining if the test machine is responding to queries from the test controller 14 as shown in block 710. This may include communicating with a module on the test machine other than the test module so that if the test module is not responding, the other module may be responding. If the test machine is not responding to queries, the method has determined that a test unit has undergone a software or hardware malfunction. In response, as shown in block 712, the method includes remotely cycling power on the test unit using a remotely addressable power supply or power module. For example, a power supply that is supplying power to a particular test unit may be cycled via a network addressable register so that a power cycle command is provided by the test controller 14 to a network addressable power supply 38 or 40 (see FIG. 1, for example). However, any suitable configuration may be used. As such, a remotely controlled hard reboot can be performed on a per-test unit basis. A suitable client graphic user interface may also be provided for the client unit 12 so that an operator may activate the power cycle for the remotely addressable power supply 38 or 40.

As shown in block 714, the method includes queuing the next scheduled test to the test unit that has undergone the remote power cycling. Referring back to block 705, if a current test has not crashed, the method includes determining whether the current test has timed out as shown in block 716 based on a timeout period. This may be determined, for example, by checking a watchdog timer or other timeout period as desired or any other indication as known in the art that the test is no longer operating as expected. The timestamps of the status messages that the machines send back are checked. If the current test is timed out, the method proceeds to block 710 otherwise the method proceeds to block 704. If the test machine has timed out, but the machine is responding, the method includes, as shown in block 718, executing a software operating system reboot. As shown in block 720, the method includes determining whether the software reboot was successful. If not, the method includes performing the remote power cycling using the network addressable power supply as shown in block 712 otherwise the method proceeds to block 714. After the fault tolerance operations have been completed, the method may continue as needed.

Figure 8:
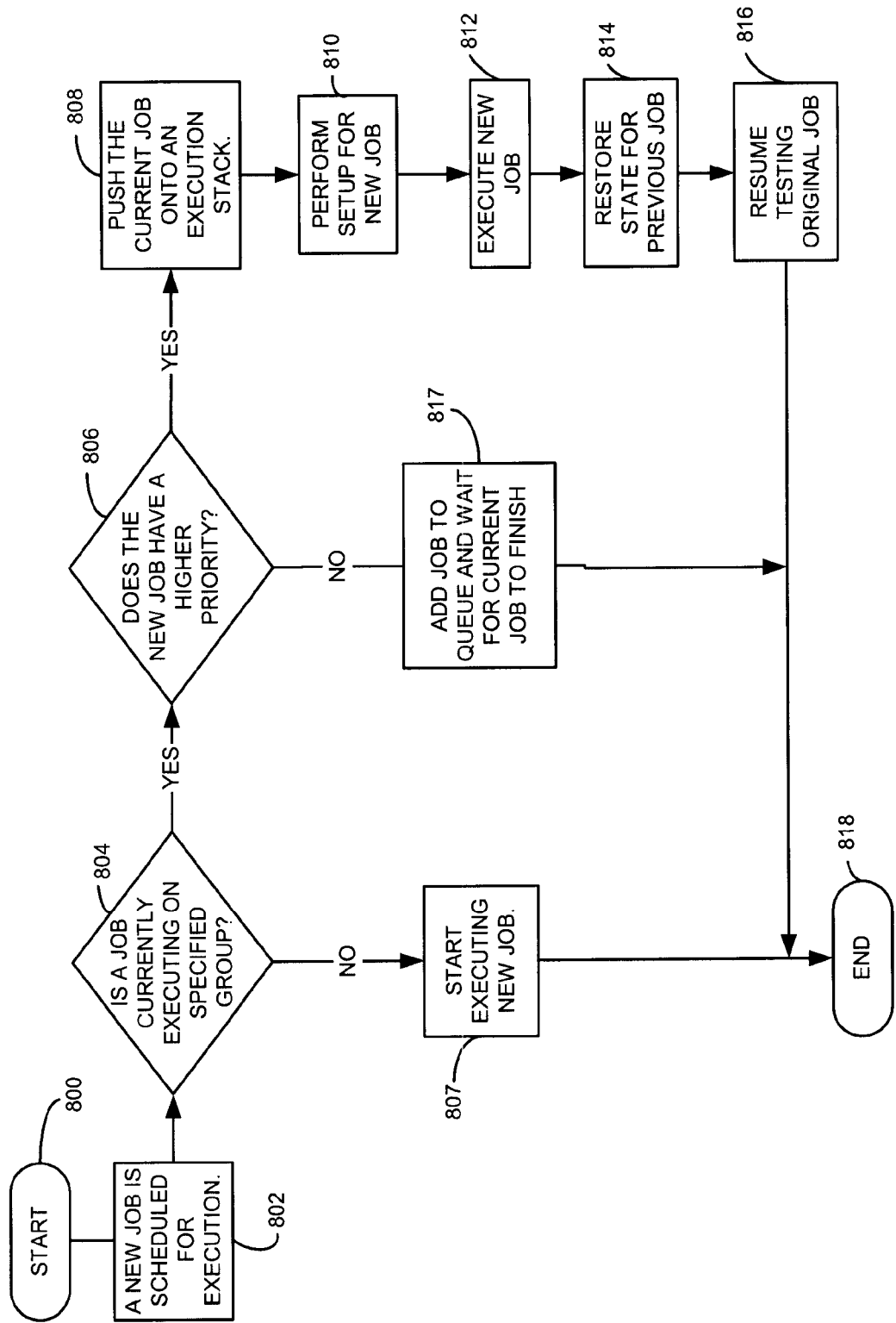
FIG. 8 is a flowchart illustrating one example of a method for testing software in accordance with one embodiment of the invention.

FIG. 8 illustrates a method for testing software that can be executed, for example, by the test coordinator or any other suitable module or modules and performs a type of test job preemption operation. As shown in block 800, the method begins and as shown in block 802, a new job is scheduled for execution by a selected group of test units. As shown in block 804, the method includes determining if a job is currently executing on a specified group of test units. If not, the method includes starting the execution of the new job by the specified group as shown in block 807. However, if a job is currently executing on a specified group, job preemption may occur. For example, as shown in block 806, the method includes determining if the new job has a higher priority than the current job. The priority may be set, for example, by an operator via a graphic user interface when setting up a job run. As such, the method includes determining whether a new job to be assigned to a group of test units has a higher priority than a current job being executed. If so, as shown in block 808, the method includes pushing the current job onto an execution stack, meaning the method includes storing the current job and any related information because it will be preempted by a higher priority new job. As such, the method includes halting the current job and storing state information of the current job. Examples of state information include, for example, last test executed, steps required to restore the correct driver state, system state (display depth, color depth, etc), etc. The method then includes executing the new job and restoring the state information of the current job after the new job has been executed. For example, as shown in block 810, the method includes performing a set of operations for the new job and as shown in block 812, executing the new job on the group of test units. As shown in block 814, the method includes restoring the state of the previous job after the new job has been completed. As shown in block 816, the method includes resuming testing of the original job and the method may then end as shown in block 818 where after a new job being scheduled for execution may then be evaluated to see whether it preempts a current job in a group of test units.

Referring back to block 806, if the new job does not have a higher priority, the method includes, as shown in block 817, adding the job to the queue and waiting for the current job to finish. The new job will be executed in the order respective with its position in the queue. The method then continues to block 807 when the new job begins execution.

Figure 9:
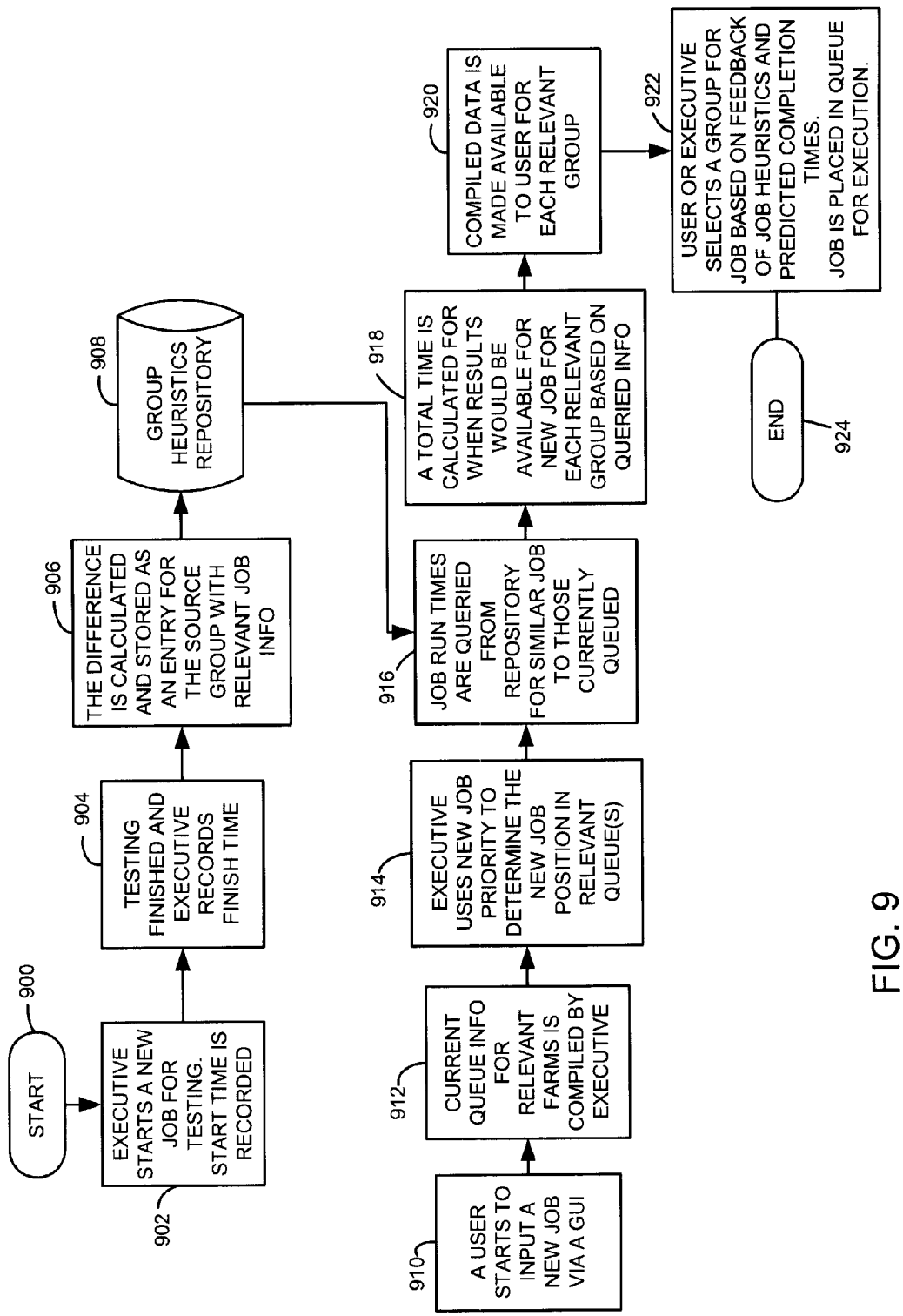
FIG. 9 is a flowchart illustrating one example of a method for testing software in accordance with one embodiment of the invention.

FIG. 9 illustrates a method for testing software that includes a compilation of job heuristics and the use of job heuristics for operator decisions if desired. The process may be performed, for example, by the executive or any other suitable element as desired. As shown in block 900, the collection of job heuristics may begin and as shown in block 902, the method includes recording a start time of a new job that is being executed on a test unit. As shown in block 904, the method includes recording the finish time for the test. As shown in block 906, the method includes, for example, calculating the difference between the start time and the finish time and storing the resulting data in a group heuristic data depository 908 on a per-group basis with the relevant job information. Other heuristic information that is determined and stored in the group heuristic depository (memory 20 of FIG. 1) is data representing how often a test unit in a group is used relative to other test units in the group, an average test runtime for all tests run on a test unit in a group, an average time a test unit is idle in a group, and a per-group average job queue length. Other heuristic data may also be compiled and used if desired.

As shown in block 910, when a user selects a new job to be run via a graphic user interface, a current queue for relevant groups of test units is compiled, such as by the executive 32 as shown in block 912. As such, in response to the selection of a new job to be tested, current queue information for relevant groups of test units, such as those that have the desired hardware and software configurations is compiled. As shown in block 914, the job priority associated with the new job is used to determine the new job position in the relevant queue or queues to present the user with estimates of testing times for the possible test unit groupings. As shown in block 916, job runtimes are obtained from the group heuristics repository for similar jobs to those currently queued. As shown in block 918, the method includes determining a total time for when results would be expected to be available for the new job for each relevant group based on the job runtime information from the group heuristic repository (e.g., stored in memory 20). As shown in block 920, the method includes presenting for display to a user, such as via a graphic user interface, the compiled heuristic data for each relevant group. As shown in block 922, the user may select, via the graphic user interface, a group of test units for the new job based on the feedback of the job heuristics and the predicted completion times. The job is then placed in the selected queue for execution. Alternatively, the selection may be done automatically by the executive 32 based on stored rule data if desired. As shown in block 924, the method then ends and may be begun again if desired.

Figure 10:
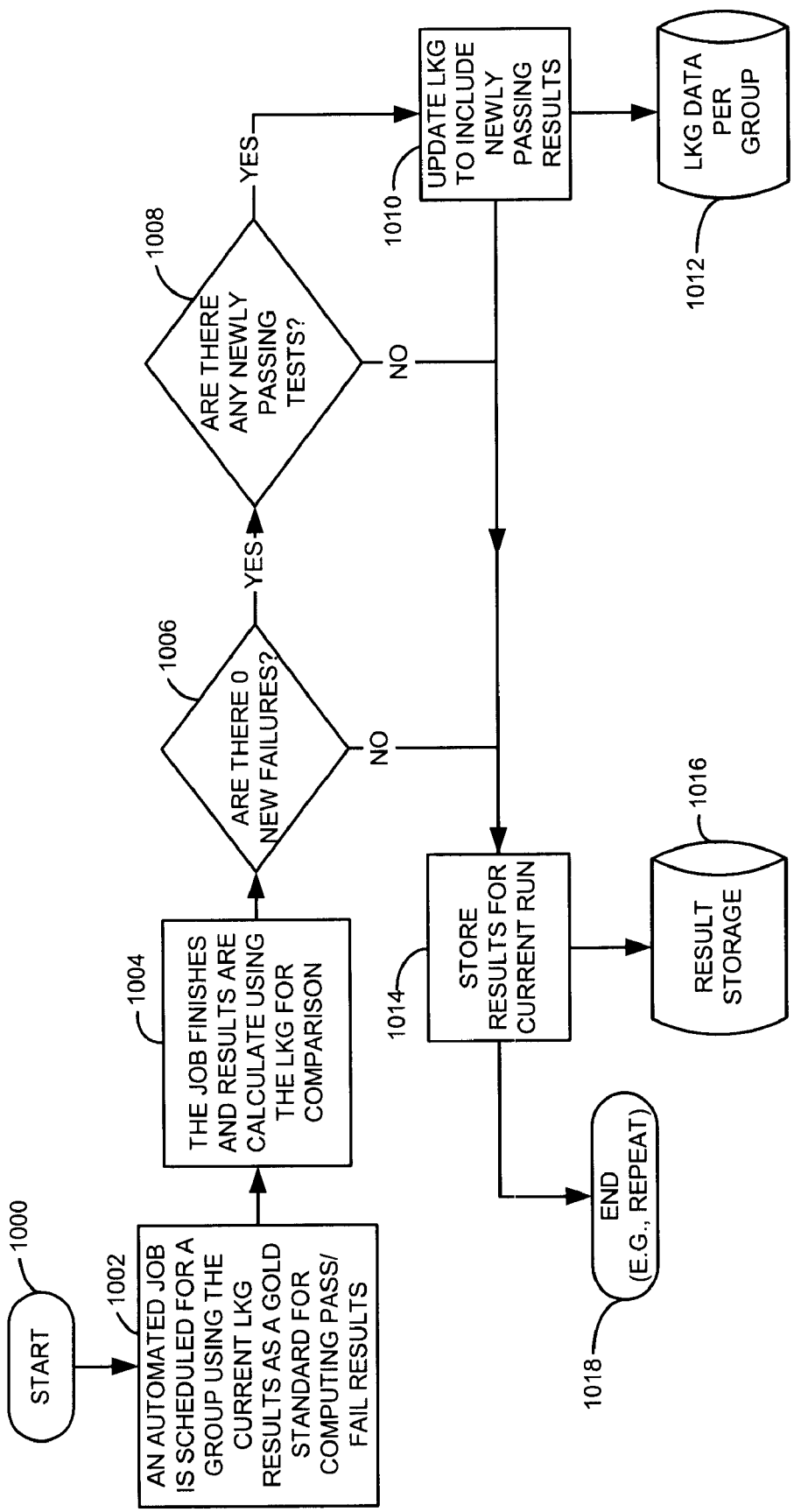
FIG. 10 is a flowchart illustrating one example of a method for testing software in accordance with one embodiment of the invention.

FIG. 10 illustrates another example of a method for testing software which utilizes last known good test results. As shown in block 1000, the method begins when, for example, the results of a test are available. As shown in block 1002, the method includes referencing last known good results based on a prior software test. As shown, the method includes using the stored last known good results as a test result baseline for a subsequent test. For example, when a job is scheduled for a group, the system uses the current last known good results as a baseline or gold standard for computing pass/fail test results. As shown in block 1004, the method includes running the subsequent test and analyzing the results to calculate the results using the last known good results for comparison. As shown in block 1006, if there are no new failures, the method includes, as shown in block 1008, determining if there are any newly passing tests. As such, when the test is run, the method includes determining whether there are any newly passing portions of the test. If so, as shown in block 1010, the method includes updating the last known good results to include the newly passing portions on a per-test basis. This may be done in any suitable manner and these results may be stored in the memory 20 and as such, the last known good results may point to the new results of the particular test. The new results for the particular test are then stored as the last known good data on a per-group basis as shown in block 1012. The complete group of test results are then stored for the current test run as shown in block 1014 and 1016. The results stored in the last known good results storage may be stored, for example, in memory 20. The updated last known good results are used for a baseline for yet another subsequent test that is run by the test unit in a group since the method is repeated as represented by block 1018. The system may also prepare, for selection by the user, through a GUI for example, the last known good results of a current test that improve over the previous known good results so that the user may select a specified result as part of the baseline to be used in subsequent tests. As such, a GUI may select a result set of test that uses a gold standard or baseline based on user input if desired. Alternatively, the system may select the last known good results as the gold standard or baseline. Accordingly, a gold standard may be selectively modified as desired through a graphic user interface based on previous test results.

Figure 11:
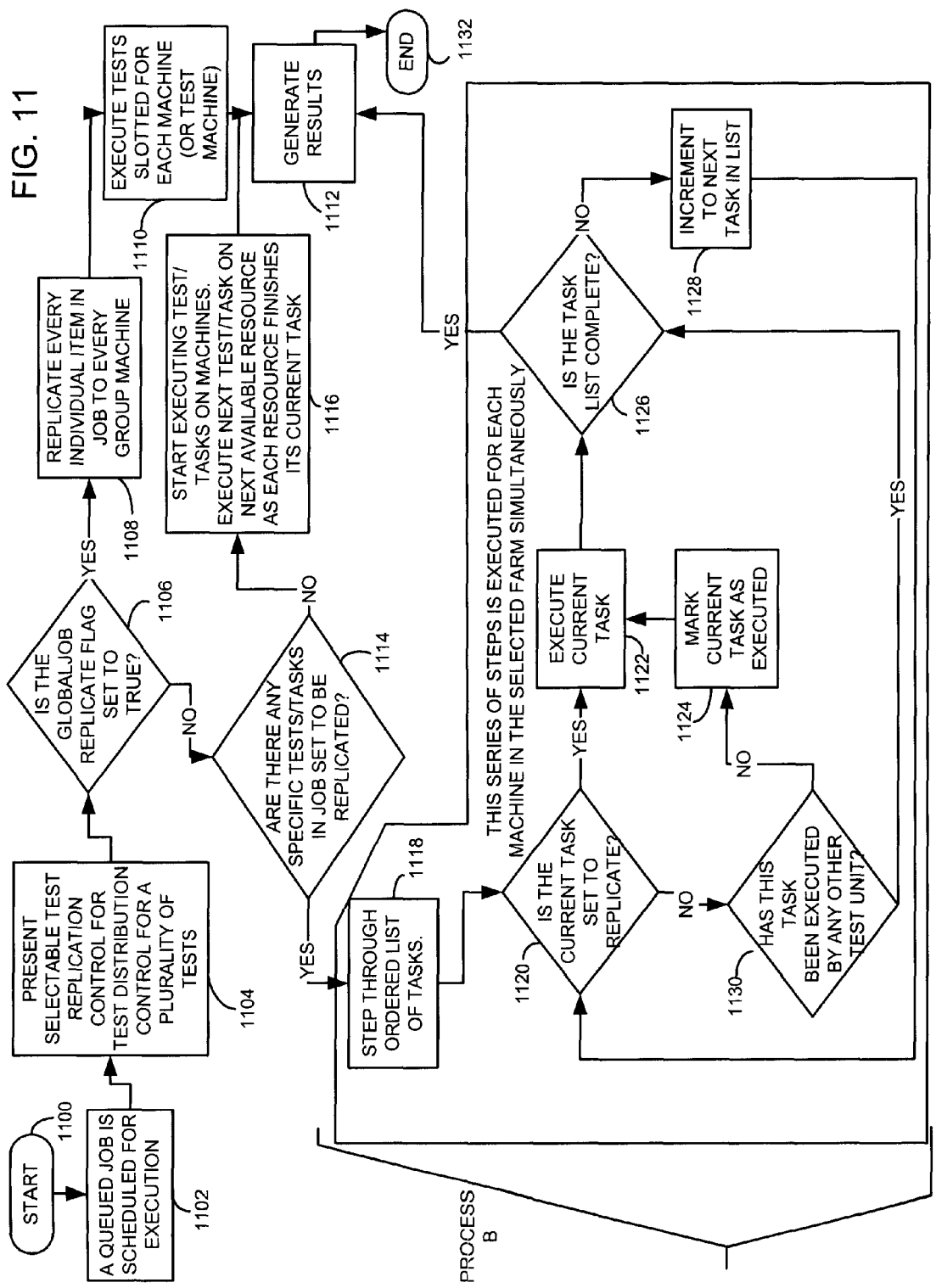
FIG. 11 is a flowchart illustrating one example of a method for testing software in accordance with one embodiment of the invention.

FIG. 11 illustrates one example of a method for testing software that facilitates the control of replication of test jobs across a plurality of test units or the control of distribution of tests from a job to different test units in a same group. The test controller provides a graphic user interface for a user which allows the user to select a test group. The graphic user interface includes data that can be selected via suitable fields or from pull down menus or any other suitable user interface technique as desired which includes global load balance selection or replicated testing control. A job is then queued to an appropriate group via the executive 32. As such, the test controller provides selectable test control data (e.g., GUI pull down menu data) to select test replication control data such as data indicating that a particular test is to be replicated across a plurality of test units in a group or test control data through select test distribution data to control distribution of tests from a test job to different test units in a group. For example, as shown in block 1100, the test controller may provide a graphic user interface for the client unit so that the operator can schedule a test job which is then queued for execution as shown in block 1102. The method includes presenting the selectable replication control data or test distribution control data for a plurality of tests to the user via graphic user interface, as shown in block 1104. As shown in block 1106, the method includes determining if the selectable test control data indicates that a global job "replicate" condition was selected, such as by checking a suitable flag, based on user input. If so, as shown in block 1108, the method includes replicating every individual item in a job to every test machine in a group. As shown in block 1110, the method includes executing the tests slotted for each machine and generating the test results as shown in block 1112 and the process may end as shown in block 1132.

Referring back to block 1106, if however the selectable test control data does not indicate a selection of a global job for replication, as shown in block 1114, the method includes determining if there are any specific tests in a job that have been selected to be replicated by the user as entered via the graphic user interface. Also, certain tests may be set to "replicate" mode by an administrator. If there are none, as shown in block 1116, the method includes executing the scheduled job without replication. However, if there are specific tests in a job that have been selected for replication, as shown in block 1118, the method includes walking through the list of tasks that could be selected that were presented, for example, by the test coordinator.

The group of steps identified as process B may be carried out, for example, for each machine in the selected group simultaneously. As shown in block 1120, the method includes determining if a current task within a job contains a replicate status. If so, as shown in block 1122, the method includes executing the current task. As shown in block 1126, if the tasks list has been completed so that all tasks have been executed, the results are then stored as shown by block 1112 and the process ends. If the task list has not been completed in block 1126, the method continues to the next task in the list as shown in block 1128. Referring back to block 1120, if the current task is not set to replicate, the method includes, as shown in block 1130, determining whether the task or job has been executed by any other test machine. If so, the method continues to block 1126 and if not, the task is marked as being executed as shown in block 1124. Once the task is marked as executed, the task is then executed as shown in block 1122.

Figure 12:
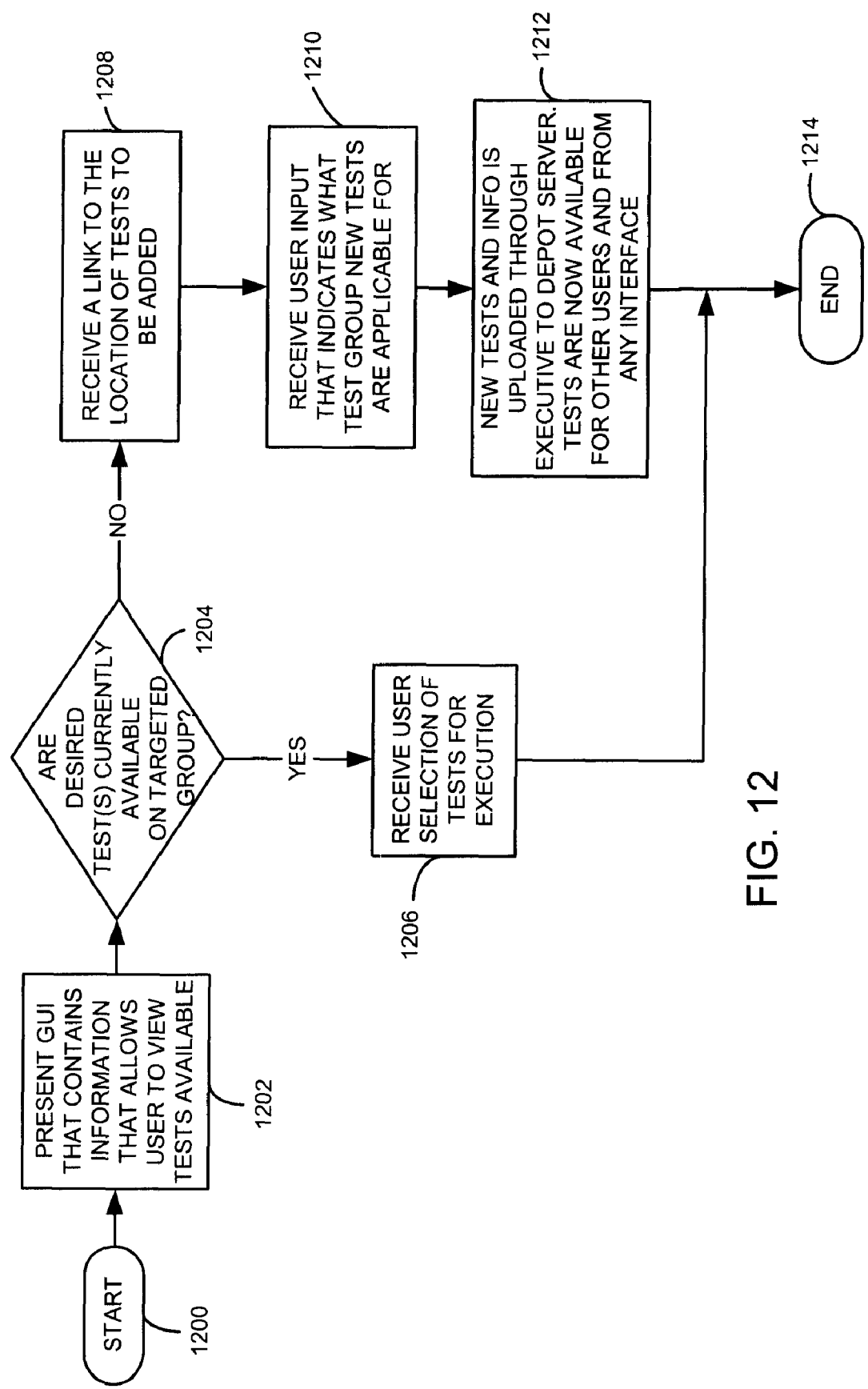
FIG. 12 is a flowchart illustrating one example of a method for testing software in accordance with one embodiment of the invention.

FIG. 12 illustrates one method for testing software that may be carried out, for example, by the executive 32 and begins, for example, in block 1200. As shown in block 1202, the method includes presenting a graphic user interface containing information that allows a user to view tests that are available. As such, the method includes presenting a graphic user interface on a display, such as the client unit 12, wherein the graphic user interface presents data representing potential tests to be selected for execution on a group of test units and data representing which of the potential test units are currently available to be run. It is also possible to correlate which tests may be executed on each respective possible test unit group, presenting this data to the user. The method also includes uploading new user specific tests and displaying them as being available for use by other users. As shown in block 1204, the method includes determining whether the desired tests are currently available for the targeted group of test units. If so, the method includes receiving the user selection of tests for execution. This is shown in block 1206. As shown in block 1208, if the desired tests are currently not available for the targeted group, the method includes allowing a user to provide a link to new test resources. As shown in block 1210, the method includes receiving user input indicating on what group of groups of units the new tests are to be available. As shown in block 1212, the method includes uploading new user specific tests and displaying them as being available for use by the users. The tests are stored, for example, on the depot server. The method may then end as shown in block 1214 and may be repeated as desired.

Among other advantages, the above methods, system and apparatus provide various improvements over conventional software test systems and is recognized by one of ordinary skill in the art. The system and method provides for the selection of groups of machines and can provide dynamic load balancing either by distributing the same test set across multiple groups or portions of test units within a group or across multiple test units. Other advantages will be recognized by those of ordinary skill in the art. For example, providing real time current testing status for a user can allow the user to make decisions as to whether additional test units should be allocated to particular test groups or groups of test units.

It is therefore contemplated that the present invention cover any and all modifications, variations or equivalents that fall within the spirit and scope of the basic underlying principles disclosed above and claimed herein.

What is claimed is:

1. A software or hardware test apparatus comprising:
one or more processors; and
memory containing executable instructions that when executed cause the one or more processors to:
repeatedly obtain testing status of a plurality of test units in a group external to the one or more processors and memory while the plurality of test units are testing hardware on the test units or software being executed on the test units; and
provide for display, the current testing status of the plurality of test units of the group while the plurality of test units are performing the software or hardware testing.

2. The software or hardware test apparatus of claim 1 wherein the memory contains executable instructions that when executed cause the one or more processors to at least determine testing status as to whether a test unit is idle for testing software or hardware and determine, on a per test unit basis, an amount of time remaining for a particular test set to complete and provide the testing status and data representing the amount of time remaining for the particular software or hardware test to complete for display on a display.

3. The software or hardware test apparatus of claim 1 wherein the memory contains executable instructions that when executed cause the one or more processors to generate a real time status registry that contains asynchronously received status data from all test units in the group and is updated continuously during testing.

4. A software or hardware test apparatus comprising:
one or more processors; and
memory containing executable instructions that when executed cause the one or more processors to:
repeatedly obtain testing status of a plurality of test units in a group while the test units are testing software being executed thereon or hardware;
provide for display, the current testing status of the plurality of test units of the group while the plurality of test units are performing software or hardware testing;
determine whether a first test unit assigned to a first group of test units is available for reassignment to a second group of test units;
if so update a test coordinator registry with an identifier associated with the second group for the first test unit; and
cause the first unit to perform a test as a test unit of the second group.

5. A software or hardware test apparatus comprising:
one or more processors; and
memory containing executable instructions that when executed cause the one or more processors to:
compile heuristic data for a plurality of test units that are assigned to one or more groups of test units wherein the heuristic data comprises at least data representing a frequency of use on a per test unit basis over a period of time;
evaluate job queue sizes on a per group basis to determine whether there are under utilized test units in the group;
determine on a per group of test unit basis whether a first group allows dynamic reassignment of a test unit in the group based on at least the compiled heuristic data; and
if so, reassigning the test unit whose heuristic data meets a specific set of criteria.

6. A software or hardware test apparatus comprising:
one or more processors; and
memory containing executable instructions that when executed cause the one or more processors to:
compile heuristic data for a plurality of test units that are assigned to one or more groups of test units wherein the heuristic data comprises at least data representing a frequency of use on a per test unit basis over a period of time;
evaluate job queue sizes on a per group basis to determine whether there are under utilized test units in the group;
determine on a per group of test unit basis whether a first group allows dynamic reassignment of a test unit in the group based on at least the compiled heuristic data;
if so, reassigning the test unit whose heuristic data meets a specific set of criteria; and
determine on a per group of test unit basis whether a first group allows dynamic reassignment of a test unit in the group also based on at least whether a test unit has hardware, software and an operating system compatible for a job of interest.

7. The software or hardware test apparatus of claim 5 wherein the memory contains executable instructions that when executed cause the one or more processors to reassign the test unit whose heuristic data meets a specific set of criteria to a different group of test units by updating a test coordinator registry with a new group identifier for the test unit to be reassigned.

8. The software or hardware test apparatus of claim 5 wherein the memory contains executable instructions that when executed cause the one or more processors to determine if a test unit has undergone a software or hardware malfunction and in response remotely cycle power on the test unit using a remotely addressable power supply.

9. The software or hardware test apparatus of claim 5 wherein the memory contains executable instructions that when executed cause the one or more processors to determine whether a new job to be assigned to a group of test units has a higher priority than a current job being executed; if so halting the current job and storing state information of the current job; then executing the new job and restoring the state information of the current job after the new job has executed.

10. The software or hardware test apparatus of claim 5 wherein the memory contains executable instructions that when executed cause the one or more processors to compile heuristic data for the plurality of test units wherein the heuristic data comprises at least data representing: how often a test unit is used relative to other test units in the same group, an average test runtime for all tests run on a test unit in a group, an average time a test unit is idle in a group, and a per group average job queue lengths.

11. The software or hardware test apparatus of claim 5 wherein the memory contains executable instructions that when executed cause the one or more processors to:
store last known good results based on a prior software test;
using stored last known good results as a test result baseline for a subsequent test;
running the subsequent test and determining whether there are any newly passing portions of the test;
if so updating the last known good results to include the newly passing portions on a per group basis; and
using the updated last known good result as a baseline for yet another subsequent test that is run by a test unit in the group.

12. The software or hardware test apparatus of claim 5 wherein the memory contains executable instructions that when executed cause the one or more processors to provide selectable test control data to select test replication control data that replicates a test job across a plurality of test units in a group, resulting in each test unit executing each test in the job, or to select test distribution data to allow distribution of tests from a test job to different test units in a group, resulting in each test in the job being executed by one test unit.

13. The software or hardware test apparatus of claim 5 wherein the memory contains executable instructions that when executed cause the one or more processors to:
present a graphic user interface on a display wherein the graphic user interface comprises data representing potential tests to be selected for execution on a group of test units and data representing which of the potential tests are currently available to be run by a current group of test units and data representing selected tests from the potential tests that are to be run on different groups of test units; and
uploading new user specified tests and displaying them as being available for use by other users.

14. A method for testing software or hardware comprising:
repeatedly obtaining, by one or more processors executing instructions contained in memory, testing status of a plurality of test units in a group external to the one or more processors and memory while the plurality of test units are testing hardware on the test units or software being executed on the test units; and
providing for display, by said one or more processors, the current testing status of the plurality of units of the group while the plurality of test units are performing the software or hardware testing.

15. The method of claim 14 comprising at least determining testing status as to whether a test unit is idle or testing software or hardware and determine, on a per test unit basis, an amount of time remaining for a particular software test to complete and providing the testing status and data representing the amount of time remaining for the particular software test to complete for display on a display.

16. The method of claim 14 comprising asynchronously generating a real time status registry that contains status data for all test units in the group and is updated continuously during testing.

17. A method for testing software or hardware comprising:
repeatedly obtaining, by one or more processors, testing status of a plurality of test units in a group while the test units are testing software being executed thereon;
providing for display, by said one or more processors, the current testing status of the plurality of units of the group while the plurality of test units are performing software or hardware testing;
determining by said one or more processors, whether a first test unit assigned to a first group of test units is available for reassignment to a second group of test units;
if so updating by said one or more processors, a test coordinator registry with an identifier associated with the second group for the first test unit; and
causing the first unit to perform tests as a test unit of the second group.

18. A method for testing software or hardware comprising:
compiling, by one or more processors, heuristic data for a plurality of test units that are assigned to one or more groups of test units wherein the heuristic data comprises at least data representing a frequency of use on a per test unit basis over a period of time;
evaluating by said one or more processors, job queue sizes on a per group basis to determine whether there are under utilized test units in the group;
determining by said one or more processors, on a per group of test unit basis whether a first group allows dynamic reassignment of a test unit in the group based on at least the compiled heuristic data; and
if so, reassigning by said one or more processors, the test unit whose heuristic data meets a specific set of criteria.

19. A method for testing software or hardware comprising:
compiling, by one or more processors, heuristic data for a plurality of test units that are assigned to one or more groups of test units wherein the heuristic data comprises at least data representing a frequency of use on a per test unit basis over a period of time;
evaluating by said one or more processors, job queue sizes on a per group basis to determine whether there are under utilized test units in the group;
determining by said one or more processors, on a per group of test unit basis whether a first group allows dynamic reassignment of a test unit in the group based on at least the compiled heuristic data; and if so, reassigning by said one or more processors, the test unit whose heuristic data meets a specific set of criteria; and determining by said one or more processors, on a per group of test unit basis whether a first group allows dynamic reassignment of a test unit in the group also based on at least whether a test unit is hardware and operating system compatible for a job of interest.

20. The method of claim 18 comprising reassigning the test unit, whose heuristic data meet certain criteria, to a different group of test units by updating a test coordinator registry with a new group identifier for the test unit to be reassigned.

21. The method of claim 18 comprising determining if a test unit has experienced a software or hardware malfunction and in response remotely cycle power on the test unit using a remotely addressable power supply.

22. The method of claim 18 comprising determining whether a new job to be assigned to a group of test units has a higher priority than a current job being executed; if so halting the current job and storing state information of the current job; then executing the new job and restoring the state information of the original job after the new job has executed.

23. The method of claim 18 comprising compiling heuristic data for the plurality of test units wherein the heuristic data comprises at least data representing: how often a test unit is used relative to other test units in the same group, an average test runtime for all tests run on a test unit in a group, an average time a test unit is idle in a group, and a per group average job queue lengths.

24. The method of claim 18 comprising:

storing last known good results based on a prior software or hardware test set;

using stored last known good results as a test set result baseline for a subsequent tests;

running the subsequent test set and determining whether there are any newly passing portions of the test set;

if so updating the last known good results to include the newly passing portions on a per group basis; and using the updated last known good result as a baseline for yet another subsequent test set that is run by a test unit group.

25. The method of claim 18 comprising providing selectable test control data to select test replication control data that replicates a test job across a plurality of test units in a group, resulting in each test unit executing each test in the job, or to select test distribution data to allow distribution of tests from a test job to different test units in a group, resulting in each test in the job being executed by one test unit.

26. The method of claim 18 comprising:

presenting a graphic user interface on a display wherein the graphic user interface comprises data representing potential tests to be selected for execution on a group of test units and data representing which of the potential tests are currently available to be run by a current group of test units and data representing selected tests from the potential tests that may be run on different groups of test units; and uploading new user specified tests and displaying them as being available for use by other users.

* * * * *